Dec. 23, 1941.  H. F. PATTERSON  2,267,476
FLUID COUPLING
Filed June 9, 1939  2 Sheets-Sheet 2
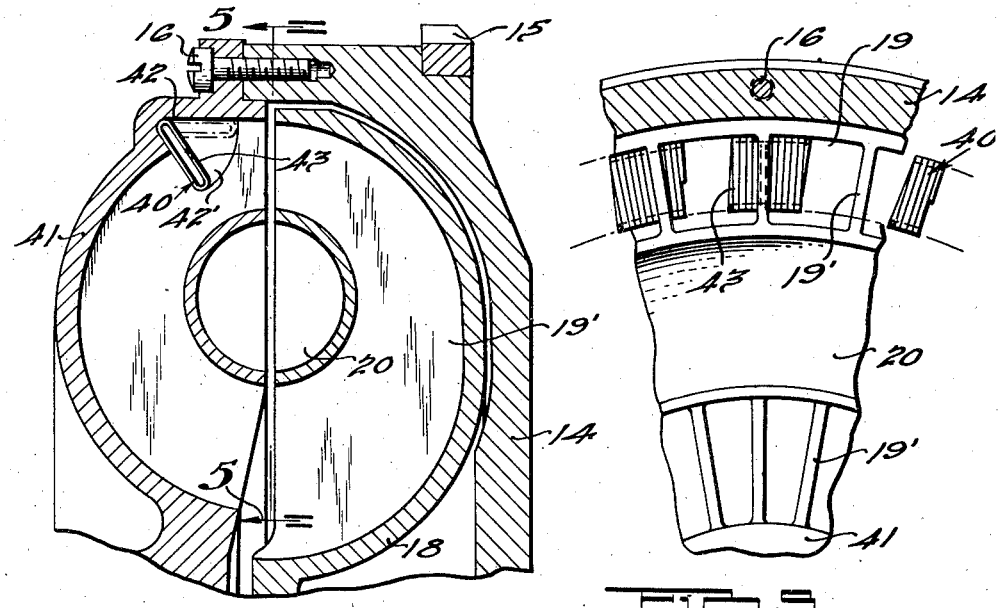
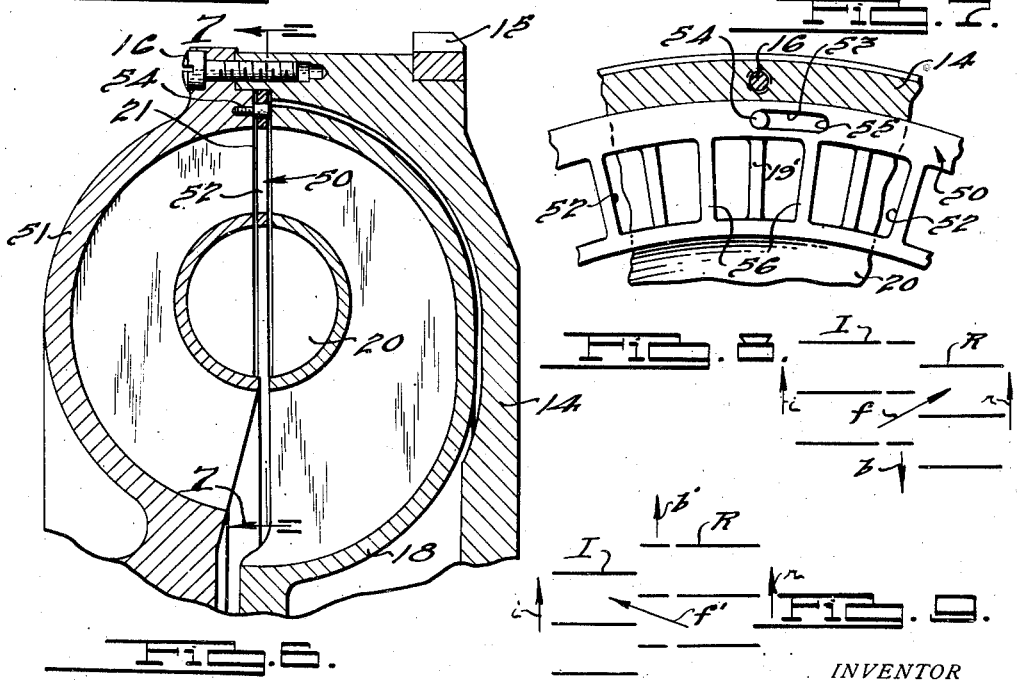
INVENTOR
Herbert F. Patterson.
BY Harness, Lind, Patee & Harris
ATTORNEYS.

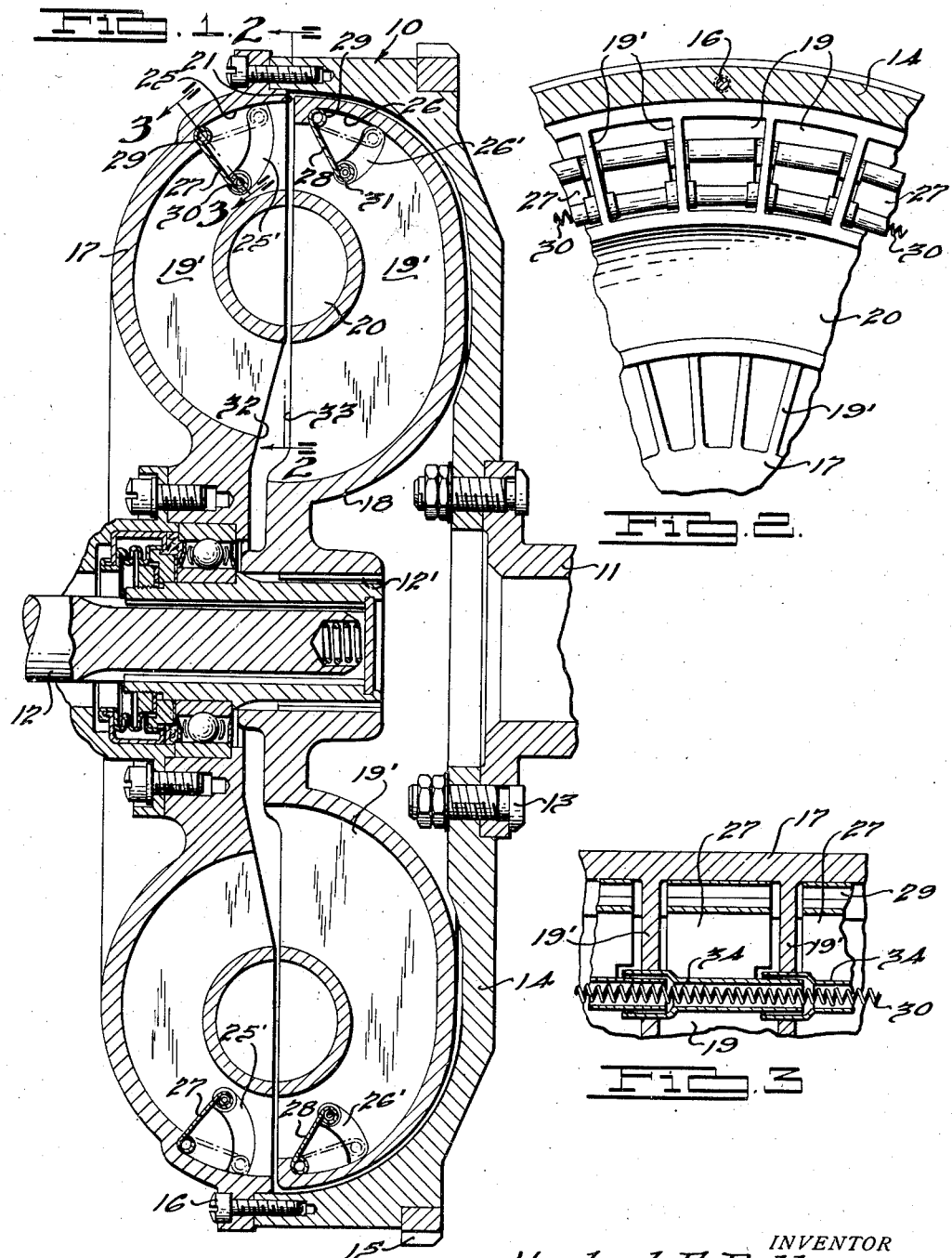

Patented Dec. 23, 1941

2,267,476

UNITED STATES PATENT OFFICE 2,267,476

FLUID COUPLING

Herbert F. Patterson, St. Clair Shores, Mich., assignor to Chrysler Corporation, Highland Park, Mich., a corporation of Delaware Application June 9, 1939, Serial No. 278,185

3 Claims. (Cl. 60—54)

This application is a continuation in part of my copending application, Serial No. 237,893, filed October 31, 1938, and now abandoned.

This invention relates to power transmitting devices and refers more particularly to fluid couplings, clutches, drives and the like.

Heretofore in motor vehicle power transmission systems employing fluid couplings between the motor and the final drive mechanism, difficulty has been experienced by reason of the tendency of the vehicle to "creep" or drive slowly when the engine is idling and the transmission is in gear. In other words, it has been found necessary in bringing the vehicle to rest, to manipulate the transmission into neutral or to apply the usual brakes to oppose the drive or drag transmitted through the fluid coupling at engine idling speed.

The principal object of the invention is to eliminate the aforesaid difficulty by providing an improved fluid coupling having a fluid control member by means of which the fluid flow between the passages of the impeller and runner members may be automatically and effectively controlled in such manner that, at engine idling speed, there is substantially no circulation of fluid between the impeller and runner.

Another object of the invention is to provide a fluid coupling of this character having a fluid control member which is responsive to predetermined speeds of rotation of at least one of the rotating members of the coupling.

Another object of the invention is to provide a fluid coupling having a fluid control member the position of which is controlled by the action of the fluid.

Another object of the invention is to provide a control mechanism for a fluid coupling of this character which is housed substantially within the fluid passages of the impeller and runner structures in such a manner that the overall length of the fluid coupling need not be increased.

A further object of the invention is to provide a fluid coupling in which the flow of fluid between the passages of the impeller and runner members is automatically disrupted whenever the speed of the runner exceeds that of the impeller.

Further objects and advantages of the invention will be apparent from the following detailed illustrative embodiments of the principles of the invention, reference being had to the accompanying drawings, in which:

Fig. 1 is a sectional view axially through the improved fluid coupling.

Fig. 2 is a vertical sectional view taken on the line 2—2 of Fig. 1.

Fig. 3 is an enlarged sectional view taken approximately as indicated by the line 3—3 of Fig. 1.

Fig. 4 is a fragmentary sectional view corresponding to Fig. 1 but illustrating a modified form of the invention.

Fig. 5 is a fragmentary vertical sectional view taken as indicated by the line 5—5 of Fig. 4.

Fig. 6 is a fragmentary sectional view corresponding to Fig. 1 but illustrating another modified form of the invention.

Fig. 7 is a fragmentary vertical sectional view taken approximately as indicated by the line 7—7 of Fig. 6.

Figs. 8 and 9 are diagrammatic views illustrating the action of the fluid under two conditions of operation of the device shown in Fig. 6.

In the form of the invention illustrated in the drawings, referring specifically to Fig. 1, the improved fluid coupling, generally designated by the numeral 10, is adapted to transmit a drive between a power driving shaft 11, such as an engine crankshaft, and a driven shaft 12. The driving shaft 11 is drivingly connected at 13 to a flywheel 14 having starter teeth 15 adapted for engagement with the usual engine starting device (not illustrated herein but of well known construction). The flywheel 14 has fixed thereto by means of the screws 16 the impeller or driving member 17 of the fluid coupling. The driven shaft 12 corresponds to the driving shaft which ordinarily connects the clutch of a vehicle to the transmission mechanism thereof. A runner or driven member 18 of the fluid coupling 10 is non-rotatably mounted on the driven shaft 12 by means of the splined connection 12'.

Formed in the impeller and runner structures 17 and 18, respectively, are a plurality of vanes 19' forming passages or chambers 19 (best shown in Fig. 2) which extend around an annular vortex chamber or space 20 so that as the impeller rotates, the fluid will be thrown outwardly to a point generally designated at 21 and toward the passages 19 of the runner 18, thereby inducing rotation of the latter as is generally well known in the art. The vanes 19' may be cast integrally with the shell (as illustrated) or the shell and vanes may be stamped from sheet material whereupon the vanes are welded in place.

A series of annularly arranged recesses 25 and 26 are formed on the inner face of the impeller and runner structures respectively and a plurality of circumferentially spaced gate elements 27 and 28 are pivotally mounted as at 29 within the recesses 25 and 26. The ends of each of the elements 27 and 28 are interconnected by annular coil springs 30 and 31 respectively. The elements 27 and 28 have tubular portions 34 which extensibly telescope each other and house the springs 30 and 31 (see Fig. 3). Arcuate slots 25' and 26' are provided in each of the vanes 19' of the impeller and runner respectively to accommodate swinging of the gate elements 27, 28. The elements 27 and 28 are normally yieldingly maintained in their illustrated position of Fig. 1 in which the fluid within each of the passages 19 of the impeller is disrupted principally by the elements 27 when the impeller is rotating at a faster rate than the runner structure although at a relatively low speed. If the runner member 18 rotates at a faster speed than the impeller, while both members are rotating at relatively low speed, the fluid in each of the passages 19 of the runner is disrupted by reason of the elements 28. The elements 27 and 28 are so constructed and arranged with respect to the vanes 19' of the impeller and runner members 17 and 18 respectively that when the impeller rotates at a sufficiently high speed the elements 27 and 28 are swung outwardly by the impinging fluid about their pivot 29 and into the recesses 25 and 26. When the elements 27 and 28 are held in the recesses 25 and 26 by the impinging fluid, the elements are out of fluid interrupting relationship with the passages and do not impede the travel of the fluid.

It is normally desirable to fill the fluid coupling to about three fourths of its capacity, the fluid being oil, water or other suitable material.

In the operation of this particular embodiment of the invention, when the driving shaft 11 is rotating faster than the driven shaft 12 but at a relatively low speed, as is the case when the vehicle is at rest or running at a slow speed, the elements 27 and 28 are maintained in their fluid interrupting condition of Fig. 1 by the action of the coil springs 30 and 31 wherein they simultaneously interrupt the fluid flow in each of the passages of the runner and impeller structures 17 and 18, respectively. This interruption of fluid flow in the passages lowers the energy transmitted to the runner 18, and consequently effects greater slippage between the impeller and the runner. This action makes it unnecessary to manipulate the transmission into neutral, or to apply the brakes of a motor vehicle in order to hold the latter at rest. If desired, a baffle or offset portion 32 may be used to assist the function of the baffle elements 27 and 28. When the vehicle operator increases the speed of the driving shaft 11 to a predetermined speed, the centrifugal force on the fluid within the coupling becomes greater and greater and consequently forces the fluid in its well known travel in the outer portions of the passages 19. In other words, the impeller 17 will rotate with the driving flywheel 14 to cause the fluid to circulate under the action of centrifugal force from a space 19 outwardly through the impeller passages for discharge into the space 21 where the fluid enters the runner passages for discharge at the space 33. The runner is thus driven from the impeller and the slippage between the parts rapidly diminishes as the speed of the impeller increases, and this increased fluid flow impinges against the elements 27 and 28 to urge them outwardly and into the recesses 25 and 26 and thus out of the path of the fluid flow.

When, under certain conditions, the driven shaft 12 overruns the driving shaft 11, as when the vehicle is coasting at a relatively low speed, the flow of fluid between the coupling elements is reversed and then flows from the space 19 outwardly through the runner passages for discharge into the space 21 where the fluid enters the impeller passages for discharge at the space 33. The fluid then impinges on the outer surface of the gate elements 28 and swings them downwardly about their pivots 29 to thereby disrupt the fluid flow tending to move from the runner at the space 21. The coil springs 30, 31 are of such strength that they tend to maintain the gate elements in fluid disrupting position at low motor speeds but permit the fluid to swing the gate elements out of fluid disrupting position at speeds above the motor idling speed. Centrifugal force acting directly upon the gate elements will, of course, have a tendency to maintain said elements out of fluid disrupting position at high rotational speeds regardless of the direction of fluid flow. The force of the fluid impinging upon the outer surface of the elements 28 during coasting, however, is sufficient under some conditions to overcome this tendency and will swing the elements 28 into the position shown in Fig. 1 if the rotational speed is low enough to permit the force of the fluid plus the force of the spring 30 to overcome the centrifugal effect.

This arrangement of the elements 27 and 28 is particularly effective by reason of their being arranged in the coupling members at a location on the fluid coupling that is at least as far from the axis thereof as the outer diameter of the vortex chamber 20, and thereby are adapted to efficiently control the fluid flow at substantially the maximum outer diameter of the passages just before the fluid of the impeller imparts its maximum energy to the runner.

It is evident that the improved fluid coupling with its self-contained elements 27 and 28 and springs 30 and 31 housed entirely within the fluid passages of the impeller and runner members can be easily balanced and maintained in balance and moved as a unit. This feature is of advantage in motor vehicle installations where it may be desirable to remove the coupling when overhauling or repairing the motor or transmission. It is to be understood that the fluid actuated elements may be used in but one of the impeller and runner structures and the effective lengths of these elements may be varied as desired.

Referring now to Figs. 4 and 5 wherein is illustrated a somewhat modified embodiment of the invention, it will be understood that many of the parts correspond to parts previously described and shown in Figs. 1 to 3 and the entire mechanism will not again be described in detail. It will be noted that the elements 27 and 28 and the springs 30 and 31 of the Fig. 1 embodiment have been omitted, and an annularly arranged continuous flattened spring 40 has been substituted therefor. It is to be understood that although but one spring 40 is shown in the Fig. 4 embodiment, another may be employed within the runner member 18 without departing from the bounds of the invention.

To receive the fluid control mechanism, the impeller member 41 has formed on its inner face an annular groove 42 within which the spring 40 is suitably fixed in such manner that it is adapted to swing in the arcuately shaped opening 42' provided in the vanes 19' of the impeller. The spring 40 comprises a plurality of finger portions 43 which are normally yieldingly urged by the inherent resiliency of the spring itself into the position illustrated in Fig. 4. The flat faces of the finger portions 43 oppose the passage of fluid simultaneously within all of the passages 19 of the impeller member 41. As the impeller rotates at an increasing speed, the fluid within the impeller impinges on the flat faces of the finger portions 43 and urges the finger portions outwardly into the groove 42 until, at a critical and predetermined speed, the spring 43 lies flat against the surface of the groove 42.

Upon reversal of fluid flow when the vehicle is travelling at low speed, as occurs when the runner drives the impeller, the action of the spring 40 is similar to that just described in connection with the gate elements 28 of Fig. 1.

Referring now to Figs. 6 and 7 wherein is shown another modification of the invention, it will be noted that the elements 27 and 28 of the Fig. 1 embodiment and the spring portions 43 of the Fig. 4 embodiment have been omitted, and that an adjustable annular baffle member 50 is carried by the impeller member 51. This baffle member is interposed at 21 between the open registering passages of the impeller and runner members and controls the fluid flow within the passages at the maximum outer diameter of said passages.

The baffle ring 50 is provided with a plurality of spaced openings 52 (best shown in Fig. 7) with intermediate wall portions 56 therebetween. The openings 52 are adapted to register with the openings of the impeller structure 51 and each of the openings 52 has side walls which are in conformity with the wall curvature of the impeller carried vanes 19'. Any suitable means may be used to limit the rotative movement of the baffle ring 50 relative to the impeller 51, such as an elongated slot 53 formed in the rim portion of the baffle ring 50 and engaged by a screw 54 fixed in the impeller as shown in Fig. 6. The baffle ring and its curved side walls in the openings 52 are so constructed and arranged with respect to the vanes of the impeller and runner members that when the impeller structure 51 rotates faster than the runner structure 18, the fluid from the impeller 51 will react on the curved walls of the ring openings 52 and rotate the ring sufficiently to align the openings 52 with the impeller carried passages 19. This rotative movement of the baffle ring 50 relative to the impeller member 51 is limited by the extremity 55 of the slot 53 striking the bolt 54. When the runner member rotates at a faster speed than the impeller, the fluid within the runner is thrown toward the space 21 as an impelling agent and impinges on the side walls of the ring openings 52 whereby the ring is rotated to bring it into its illustrated position of Fig. 7 wherein the intermediate portions 56 of the baffle ring 50 obstruct the flow of fluid into the passages of the impeller. When the baffle ring 50 has been moved by the fluid to its position of Fig. 7, the portions of the baffle ring between the openings 52 interrupt the fluid flow between the runner and impeller members whereby a sufficient reduction in torque is effected, for example, to facilitate changing of speeds in a vehicle transmission.

Figs. 8 and 9 illustrate this principle. In Fig. 8, the impeller, designated I, is shown leading the runner, designated R, both elements rotating in the direction of the arrows $i$ and $r$. This is the condition when the impeller is driving. The fluid force is then directed approximately in the direction of the arrow $f$ and therefore reacts upon the baffle member 50 and tends to move said member in the direction of the arrow $b$. As the rotation of the baffle 50 is limited by the bolt 54, the baffle will be maintained in such position that the wall portions 56 are framed with the vanes 19' of the impeller and will offer no resistance to fluid flow.

Fig. 9 shows the conditions existing when the runner is driving. The direction of rotation is of course the same as in Fig. 8, but the flow of fluid has reversed in direction and now exerts force approximately in the direction of the arrow $f'$ thereby rotating the baffle ring 50 relative to the impeller to the limit of movement permitted by the screw 54 in the direction indicated by the arrow $b'$. The wall portions 56 will thus offer resistance to fluid flow and effect a reduction in torque.

Although but several specific embodiments of the invention are herein shown and described, it will be understood that various changes in the size, shape and arrangement of parts may be made without departing from the spirit of the invention.

What I claim is:

1. In a fluid coupling of the type wherein a driven element is actuated by a driving element by means of circulation of pressure fluid through passages in said elements, means for disrupting the flow of fluid whenever said driven element runs faster than said driving element comprising an annular baffle plate carried by said driving element and mounted thereon for slight rotational movement relatively thereto by the force of said fluid, a plurality of passages in said plate adapted to register with the passages of said driving element when said driving element overruns said driven element and which are carried into a non-registering relationship by movement of said plate when said driven element overruns said driving element.

2. In a fluid coupling of the type wherein a driven element is actuated by a driving element by means of circulation of pressure fluid through passages in said elements, means for disrupting the flow of fluid whenever said driven element runs faster than said driving element comprising an annular plate carried by said driving element for rotation therewith, a plurality of passages in said plate, and means including a lost motion connection between said plate and driving element for allowing said plate to be moved circumferentially by the pressure fluid.

3. In a fluid coupling in combination, a driving element, a driven element, a plurality of passages in each of said elements through which pressure fluid is circulated to drive said driven element, means for controlling the flow of pressure fluid through said passages comprising an annular plate carried by said driving element, a plurality of passages in said plate which are adapted to register with the passages of said driving element, and a lost motion connection between said plate and said driving element whereby the pressure fluid impinging on the sides of the passages of said plate will retain said plate in its registering position relative to said driving element during the normal operation of said coupling and will move said plate out of said registering position whenever said driven element tends to drive said driving element.

HERBERT F. PATTERSON.